United States Patent
Bischoff et al.

(10) Patent No.: US 9,756,873 B2
(45) Date of Patent: Sep. 12, 2017

(54) LIQUID CONSUMPTION TRACKING

(71) Applicant: Bischoff Holdings, Inc., Red Wing, MN (US)

(72) Inventors: Brian J. Bischoff, Red Wing, MN (US); Julie A. Bischoff, Red Wing, MN (US); Scott W. Bischoff, Red Wing, MN (US)

(73) Assignee: Bischoff Holdings, Inc., Inver Grove Heights, MN (US)

( * ) Notice: Subject to any disclaimer, the term of this patent is extended or adjusted under 35 U.S.C. 154(b) by 385 days.

(21) Appl. No.: 14/330,750

(22) Filed: Jul. 14, 2014

(65) Prior Publication Data

US 2015/0024349 A1    Jan. 22, 2015

Related U.S. Application Data

(60) Provisional application No. 61/847,051, filed on Jul. 16, 2013.

(51) Int. Cl.
*G09B 19/00* (2006.01)
*A23L 1/29* (2006.01)
*A47G 21/00* (2006.01)
*A47G 23/16* (2006.01)
*A23L 33/00* (2016.01)

(52) U.S. Cl.
CPC ............... *A23L 1/293* (2013.01); *A23L 33/30* (2016.08); *A47G 21/00* (2013.01); *A47G 23/16* (2013.01)

(58) Field of Classification Search
USPC ........................................................ 434/127
See application file for complete search history.

(56) References Cited

U.S. PATENT DOCUMENTS

| | | | |
|---|---|---|---|
| 4,278,186 A | 7/1981 | Williamson | |
| 5,255,819 A | 10/1993 | Peckels | |
| 6,036,055 A | 3/2000 | Mogadam et al. | |
| 6,212,959 B1 | 4/2001 | Perkins | |
| 6,427,871 B1 | 8/2002 | Suero | |
| 7,346,427 B2 | 3/2008 | Hillam et al. | |
| 7,900,799 B2 * | 3/2011 | Kuzar | B67D 3/0006 222/40 |

OTHER PUBLICATIONS

"ILUMI Smartbottle: The new way to keep hydrated." Matt Huber + The Huber Group, Kickstarter <https://web.archive.org/web/20130715053828/http://www.kickstarter.com/projects/thehubergroup/ilumi-bottle-the-new-way-to-keep-hydrated>, 16 pgs. Jul. 15, 2013.*

(Continued)

*Primary Examiner* — Kesha Frisby
(74) *Attorney, Agent, or Firm* — Crawford Maunu PLLC (57) ABSTRACT

Liquid consumption devices, systems, and methods of using the same are described herein. One method of using a liquid consumption device can comprise determining a hydration plan for a user based on parameters of the user using a computing system, receiving data from a liquid consumption device at the computing system over a period of time, aggregating the data received over the period of time to track liquid consumption of the user, and identifying the user is outside a threshold hydration level based on the aggregated data and the determined hydration plan.

17 Claims, 5 Drawing Sheets

(56) References Cited

OTHER PUBLICATIONS

Telit Wireless Solutions, <http://www.telit.com/en/discover/market-intelligence/telit-m2m-column/archive.php?p_id=359&id_to_show=6>, 1 pg. Date Accessed: Jul. 14, 2014.
"ILUMI Smartbottle: The new way to keep hydrated." Matt Huber + The Huber Group, Kickstarter <http://www.kickstarter.com/projects/thehubergroup/ilumi-bottle-the-new-way-to-keep-hydrated>, 17 pgs. Date Accessed: Jul. 14, 2014.
"BluFit: The Smart Water Bottle", <http://www.blufitbottle.com/>, 5 pgs. Date Accessed: Jul. 14, 2014.

* cited by examiner

LIQUID CONSUMPTION TRACKING

CROSS-REFERENCE TO RELATED APPLICATIONS

This application claims the benefit of U.S. Provisional Application Ser. No. 61/847,051, filed Jul. 16, 2013, the specification of which is incorporated herein by reference.

BACKGROUND OF THE DISCLOSURE

Adequate consumption of liquid within a period of time can be beneficial for a number of health reasons. For example, drinking adequate amounts of water in a day can assist in weight loss and/or a diet, keep muscles in the body energized, keep skin looking healthier, and assist kidney functioning, among many other benefits. Health professionals recommend that a human consume sixty-four ounces of liquid (e.g., water) a day to maintain the body and to insure proper functioning. In some instances, a professional may recommend the user drink less than a particular amount of liquid due a health condition and/or symptom of the user.

DETAILED DESCRIPTION OF THE DISCLOSURE

Methods, devices, systems, and computer readable and executable instructions for tracking liquid consumption are described herein. For example, in one or more embodiments of the present disclosure a method for tracking liquid consumption can include determining a hydration plan for a user based on health information associated with a user using a computing system, receiving data from a liquid consumption device at the computing system over a period of time, aggregating the data received over the period of time to track liquid consumption of the user, and identifying the user is outside a threshold hydration level based on the aggregated data and the determined hydration plan.

The human body is composed primarily (e.g., estimated 66%) of water. Proper water consumption can be important to maintain the body and insure its proper functioning. Daily water consumption, for example, can be particularly essential for a person on a diet, with a particular disease, and/or on a medication that may dehydrate a person, among many other instances. Further, changes in the amount of liquid consumed by a person (e.g., a patient) in a day can assist medical personal in diagnosing medical conditions, preventing further medical problems, and identifying adverse reactions, among other benefits.

For instance, not drinking an adequate amount of water can directly cause kidney stones. Similarly, a risk factor for urinary tract infections can include inadequate water consumption. For example, dehydration can allow infection causing bacteria to build up in a person's bladder which may then lead to a urinary tract infection. Accordingly, it is believed that drinking sufficient amounts of water can help to prevent bacteria from building up in the bladder and/or flush out any bacteria built up in the bladder and urinary tract.

Further, for a patient with heart failure, consuming excess liquid can make the patient's heart work harder to pump the liquid around in the patient's body. This can increase the difficulty of breathing, and for this reason, people who are experiencing congestive heart failure or those who are especially prone to it may be placed on a liquid-restricted diet.

In addition to counting water consumption, it may be beneficial to track consumption of various other liquids. For example, a parent may desire to track consumption of baby formula by an infant. An athlete may desire to track consumption of electrolyte liquid (e.g., Gatorade®) consumed after working out to ensure the athlete is replenishing the athlete's body with nutrients. And, a person on a diet and/or concerned with vitamin intake can track consumption of juice to assist in determining the amount of vitamin and/or calorie intake in a day.

A number of medical conditions may require that a person and/or medical personal limit the amount of liquid consumed by the person. For example, a person with diabetes may be required to limit the amount of high-sugar liquid (e.g., soda pop and concentrated juice) consumed in a period of time. Further, a person with kidney failure, dialysis, and/or near surgery may need to keep track and/or limit the amount of liquid consumed in a period of time. And, a person in cardiac care (e.g., with heart failure) may be required to limit the consumption of liquid in a day to prevent taking in excess liquids. As discussed above, taking in excess liquid with heart failure, for instance, can cause a patient's heart to work harder to pump the liquid around their body.

Counting liquid consumption in a period of time (e.g., a day) can be a difficult task. It can be easy for a person to forget how many glasses of liquid have been consumed during a period of time (e.g., in a day) and self-reporting of a volume of liquid consumed in a period of time can be unreliable. Further, in a medical environment, such as a hospital and/or nursing home, a number of staff over a number of shifts may be responsible for tracking liquid consumed by a patient. This can make it difficult to ensure that a patient is drinking a sufficient amount of liquid and/or to detect a change in the amount of liquid a patient is consuming. Improper hydration of a patient, for instance, can lead to potentially avoidable hospitalizations. Current clinical practices include manually tracking hydration and direct patient observation. However, manually tracking hydration and/or observing patients can be inaccurate and time consuming. Further, patients with multiple chronic conditions, complex medication regiments, and/or increased frailty because of their health status can exacerbated the effects of dehydration making it difficult to determine a hydration plan.

Methods, devices, systems, and computer-readable and executable instructions for tracking liquid consumption in accordance with one or more embodiments of the present disclosure may include a liquid consumption device that can electronically track liquid consumed by a user and send data indicating liquid consumed to a computing system. The computing system can aggregate, create reports, and provide alerts to a health professional based on identifying a hydration level of the user and comparing the hydration level of the user to a threshold hydration level. A user may have a personalized threshold hydration level based on health information associated with a user. For instance, a health professional can communicate health information to the computing system to create a hydration plan containing one or more threshold hydration levels for the user. The computing system can communicate the threshold hydrations levels and/or can communicate a user is outside one or more threshold hydration levels to the liquid consumption device.

In various embodiments, the liquid consumption device can be used to coach a user, such as a patient, by providing indications on the liquid consumption device. The indications can include visual indications and/or audio indications. For instance, the liquid consumption device can contain one or more Light Emitting Diodes (LED) lights. In response to identifying the user has consumed a proper amount of liquid (e.g., has a hydration level that is within one or more threshold hydration levels), the liquid consumption device can display a first color indication (e.g., a green LED light). In response to identifying the user is outside a first threshold hydration level, the liquid consumption device can display a second color indication (e.g., a yellow LED light). For instance, the second color indication can indicate to the user that the user should drink liquid. In response to identifying the user is outside a second threshold hydration level, the liquid consumption device can display a third color indication (e.g., a red LED light). The third color indication can indicate to the user that the user needs to drink liquid (e.g., the user is not drinking sufficient liquid to stay hydrated). Alternatively and/or in addition, an indication can be provided in response to identifying the user has a hydration level that is greater than a threshold hydration level (e.g., the user has consumed more than a threshold amount of liquid).

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 1B, and a similar element may be referenced as 420 in FIG. 4. As will be appreciated, elements shown in the various embodiments herein can be added, exchanged, and/or eliminated so as to provide a number of additional embodiments of value.

As used herein, "a number of" something can refer to one or more of such things. For example, a number of persons can refer to one or more persons. As further used herein, the designators, such as "N" particularly with respect to reference numerals in the drawings, indicates that a number of the particular feature so designated can be included with a number of embodiments of the present disclosure.

Figure 1:
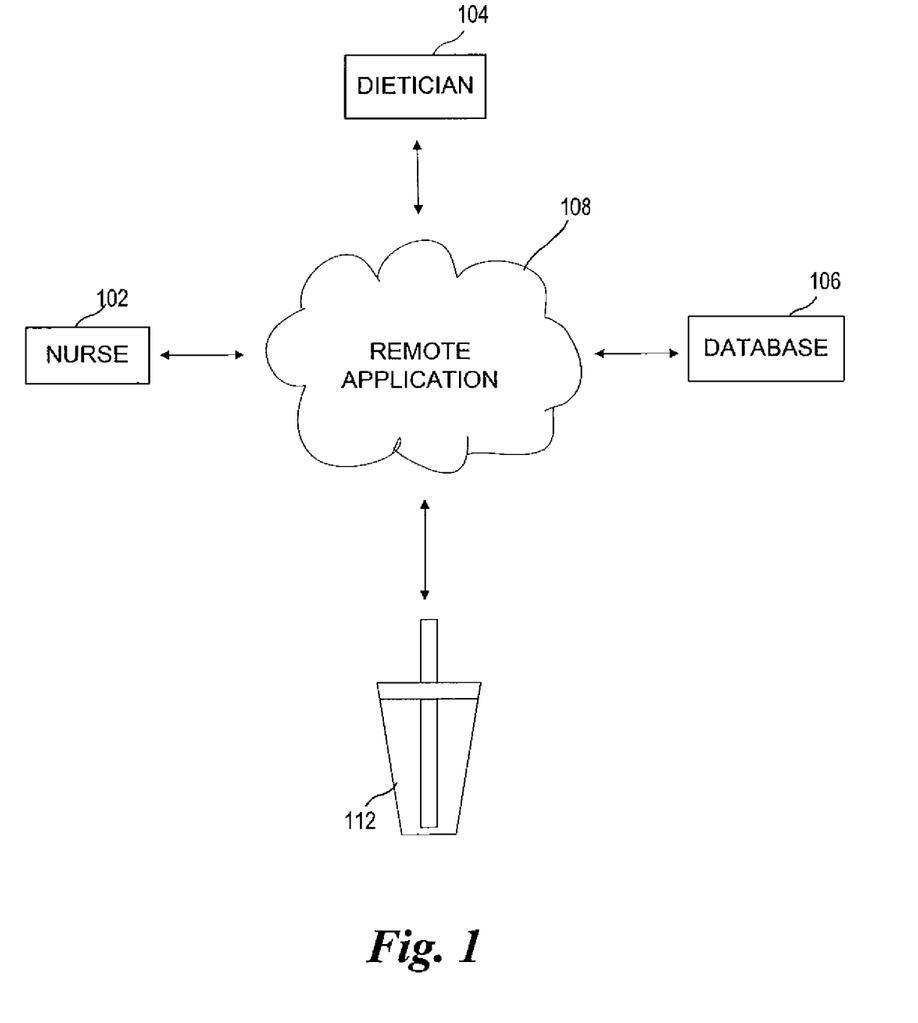
FIG. 1 illustrates an example of a liquid consumption tracking system in accordance with one or more embodiments of the present disclosure.

FIG. 1 illustrates an example of a liquid consumption tracking system 100 in accordance with one or more embodiments of the present disclosure. The liquid consumption tracking system 100 can include one or more computing devices and/or computer-readable and executable instructions, in various embodiments. For instance, a remote application 108 can include hardware components and/or software components operable to receive and/or communicate data to a variety of sources. The remote application 108 can be associated with and/or include a computing device, for example.

As illustrated in the embodiment of FIG. 1, the remote application 108 can receive and/or communicate with one or more data sources (e.g., database 106 and liquid consumption device 112) and/or health professionals (e.g., nurse 102, dietician 104). The communication can include a wireless and/or wired communication. For instance, the communication can occur via a communication path (e.g., as illustrated by the arrows). Communication paths, as used herein, can include network connections, such as logical and/or physical connections (e.g., communication links).

Health professionals can include nurses, doctors, dieticians, hospital, nursing home, and/or assisted living staff, and/or other persons associated with a user that can provide health information. Health information can include information relating to the health of the user. The health information, in various embodiments, can be input by the user, by the health professional, and/or can be provided and/or retrieved from a database 106 (e.g., an electronic health database). For example, health information can include a medical history, medical information, health status of the user, measurements of the user, health related events of the user, lifestyle information (e.g., exercise routine, diet, movement limitations, such as bed stricken, etc.) and/or suggestions for the health of the user from one or more people.

The database 106, in some embodiments, can include a healthcare file of the user. A healthcare file, as used herein, can include an electronic file and/or storage containing health information of a user. For instance, a healthcare file of the user can contain health measurements. Health measurements can be from a sensor system, medical devices, and/or observations made by healthcare staff.

A medical device can include a kiosk and/or healthcare measurement equipment for making a measurement. A kiosk, as used herein, can be a self-service kiosk that provides healthcare measurement equipment for a person to operate to take healthcare measurements. The kiosk can include a scale, blood pressure monitor, and/or a blood sugar monitor, among other healthcare measurement equipment. The healthcare measurements can be made by a healthcare professional, the user, and/or many other persons.

A measurement can include a healthcare measurement made by a medical device. The healthcare measurements can be made by healthcare professionals during medical appointments, during visits from healthcare staff to administer treatments, and/or during an evaluation of a user in a dwelling by the healthcare staff. The healthcare measurements can be made periodically, such as daily, for example.

In various embodiments, the remote application 108 can receive data from the one or more health professionals (e.g., nurse 102 and dietician 104) and/or the database 106. The data can include the health information associated with the user. The remote application 108 can use the health information to determine a hydration plan for the user. The hydration plan, in various embodiments, can include one or more threshold hydration levels. A threshold hydration level can include an amount of liquid consumed by the user in a particular period of time (e.g., eight ounces of liquid an hour, no liquid for two hours, etc.)

The hydration plan can be based on parameters established by a health professional (e.g., dietician 104, nurse 102, doctor). For instance, the parameters can be based on a health status of the user. As an example, a parameter can include a diet requirement of a user (e.g., more or less liquid than a healthy user and/or standard user), a particular disorder and/or disease that may affect liquid intake (e.g., a user with heart failure and/or on dialysis may require less liquid than a healthy user), and/or medication the user is on that may affect liquid intake (e.g., medication may dehydrate a user), among other parameters.

The remote application 108 can communicate with a liquid consumption device 112 via a communication path. The communication can include a wireless and/or wired communication via the communication path. The liquid consumption device 112 can track an amount of liquid consumed by a user over a period of time and can communicate liquid consumption data, including the amount of liquid consumed by the user, to the remote application 108 (e.g., as discussed further in regards to FIGS. 2A-2C). Liquid consumption data, as used herein, can include data of liquid consumed (e.g., amounts of liquid) of a particular user. The remote application 108 can determine a hydration level of the user based on the received liquid consumption data from the liquid consumption device 112. For instance, the remote application 108 can aggregate liquid consumption data received over the period of time for the user. In some instances, the user may be using multiple liquid consumption devices. In such an instance, the remote application 108 can aggregate data from the multiple liquid consumption devices. Based on the aggregated data, the remote application 108 can identify a hydration level of the user.

Alternatively and/or in addition, in some embodiments, the liquid consumption device 112 can determine a hydration level of the user based on the tracked amount of liquid consumed by the user. In such an instance, the liquid consumption device 112 can communicate the hydration level and/or liquid consumption data to the remote application 108.

The determined hydration level, in various embodiments, can include an amount of liquid consumed in the period of time (e.g., total amount of liquid divided by the amount of time). In some instances, a hydration level can be based on other parameters of the user. Such parameters can include age, height, weight, and/or sex among other information about the user.

In various embodiments, the hydration plan can be based on and/or modified using data received from the liquid consumption device 112. For instance, data can be received in a prior period of time and can be used to determine a hydration plan for a current period of time.

The remote application 108 can, in some embodiments, create reports associated with the user. For example, the reports can include the aggregate data over the period of time and/or over multiple periods of times. The remote application 108 can track and create reports of trends of the user's liquid consumption. For instance, the report can track a user's consumption of liquid over a day, week, a month, a year, etc. The report can include a variety of graphs, such as tables, pie charts, and/or line charts, among other graphs. A health professional (e.g., nurse 102 and dietician 104) can use the report, for instance, to identify a trend in the user's liquid consumption (e.g., the user is consuming less liquid than a month ago).

The identified hydration level can be compared to the hydration plan of the user. For instance, the remote application 108 can identify that the user is outside a threshold hydration level based on the aggregated data and the determined hydration plan. Being outside the threshold hydration level can include being above and/or below a predetermined hydration level (e.g., in the hydration plan). In response to the user being outside the threshold hydration level, an alert can be sent to the user, health professional (e.g., nurse 102 and dietician 104), and/or other person. As an example, an alert can be sent to a mobile computing device associated with a health professional, such as a nurse 102. The mobile computing device can include a cellular telephone, a tablet, and/or a laptop computer, among other mobile devices. Such an alert can include a text message, an alarm, and/or an email, among other electronic communications.

Sending an alert and/or creating reports can assist a health professional in monitoring a user's hydration status without constant check-ins and/or actively monitory a web interface. The liquid consumption system 100 can reduce staff burden as compared to individually monitoring a user's hydration. In some embodiments, the liquid consumption system can track a plurality of users' liquid consumption allowing one or more health professionals to monitor the hydration status of the plurality of users in an efficient and accurate manner. Further, long-term trends in hydration data can be analyzed and support the goal of measuring the impact of the liquid consumption devices on reducing dehydration and/or hydration related potential avoidable hospitalizations. And, the liquid consumption devices and/or liquid consumption tracking system 100 can facilitate research on the effects of mild-dehydration relative to at-risk populations, such as, those with multiple chronic conditions and complex medical schedules.

In accordance with a number of embodiments, a visual and/or audio indication on the liquid consumption device 112 can be provided based on an amount of liquid consumed and the hydration plan. For instance, in response to the hydration level of the user being outside the one or more threshold hydration levels, a first visual indication can be provided to the user to drink liquid and/or to not drink liquid. The indication can be provided by the remote application 108 communicating to the liquid consumption device 112 to provide the first visual indication. Alternatively, the remote application 108 can communicate a hydration plan to the liquid consumption device 112 and the liquid consumption device 112 can determine a hydration level of the user is outside the one or more threshold hydration levels.

The first visual indication, as used herein, can include one or more LED lights on the liquid consumption device 112. For example, in response to the hydration level of the user being outside a first threshold hydration level, a yellow LED light can be displayed on the liquid consumption device 112. In response to the hydration level of the user being outside a second threshold hydration level, a red LED light can be displayed on the liquid consumption device 112.

In various embodiments, in response to the hydration level of the user being within the one or more threshold hydration levels, a second visual indication can be provided to the user indicating the user is hydrated. The indication can be provided by the remote application 108 communicating to the liquid consumption device 112 to provide the second visual indication and/or the liquid consumption device 112 can determine to provide the second visual indication (e.g., as discussed with regards to the first visual indication). The second visual indication, as used herein, can include one or more LED lights on the liquid consumption device 112. For instance, in response to the hydration level of the user being within the one or more threshold hydration levels, a green LED light can be displayed on the liquid consumption device 112.

The indications can be used to coach the user on hydration. For instance, a health professional and/or other person can inform the user of the various indications and the meaning behind each. As an example, the user can be informed that a green LED light indicates that the user is consuming an appropriate amount of liquid to stay hydrated. The user can be informed that a yellow LED light indicates that the user should drink liquid and that a red LED light indicates the user needs to drink liquid and/or that the user is dehydrated. Alternatively and/or in addition, a user can be informed that a visual indication and/or audio indication indicates that the user should not drink liquid (e.g., a fourth LED light and/or arrow pointing downward can indicate that the user should not drink liquid and/or the hydration level of the user is greater than a threshold hydration level).

Although the present embodiment illustrates using three visual indications, embodiments in accordance with the present disclosure are not so limited. Indications can include a variety of numbers, a variety of audio sounds, a variety of colors, a variety of alternative indications (e.g., flashing LED light, pulsing beeping, etc.) and/or a variety of meanings behind each indication. For instance, the indications can include one or more LED lights in the shape of an arrow pointing upward and/or one or more LED lights in the shape of an arrow pointing downward. In response to the hydration level of a user being less than one or more threshold hydration levels, the arrow pointing upward may light up. In response to the hydration level of the user being greater than one or more threshold hydration levels, the arrow pointing downward may light up. The arrow pointing upward can indicate to a user that the user should drink liquid and the arrow pointing downward can indicate to the user that the user should not drink liquid. Each arrow can, in various embodiments, have a range of colors that can indicate to the user how far above and/or below a threshold hydration level the user is.

Figure 2A:
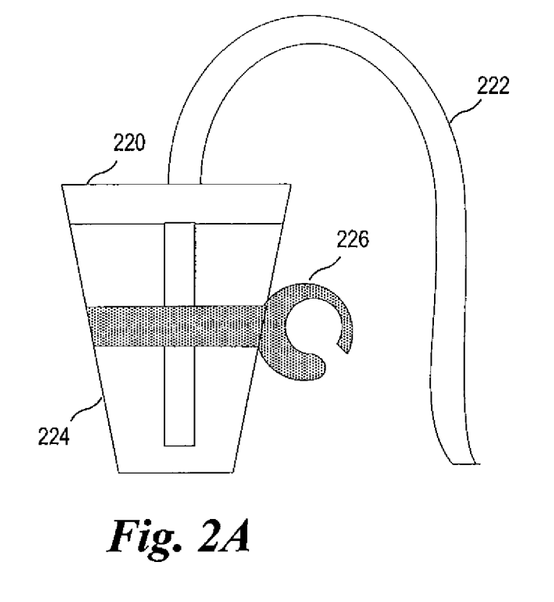
FIGS. 2A-2C illustrate examples of a liquid consumption device in accordance with one or more embodiments of present disclosure.
Figure 2B:
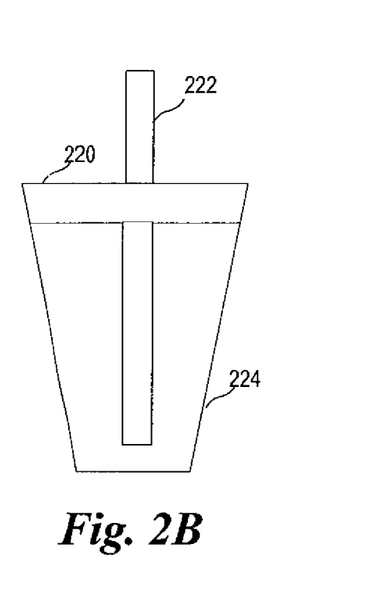
Figure 2C:
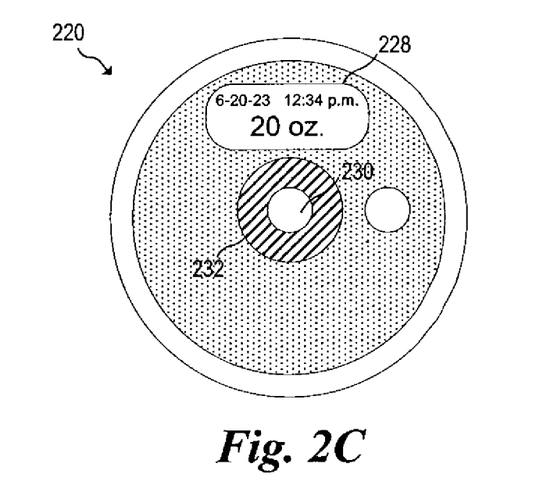

FIGS. 2A-2C illustrate examples of a liquid consumption device in accordance with one or more embodiments of the present disclosure. The liquid consumption device, as illustrated in FIGS. 2A-2B, can include a reservoir 224 (e.g., a body that can hold liquid), a tubing (e.g., a straw) 222 to connect to the reservoir 224 to the user, and a flow meter to track liquid consumed by user through the tubing 222 in a period of time. The flow meter can include electronics to track liquid consumption through the tubing 222.

For example, the reservoir 224 of the liquid consumption devices in FIGS. 2A-2B can include a body configured to contain liquid. For instance, a reservoir 224 can include a liquid container, bottle, mug, cup, or a baby bottle, among many others. The reservoir 224 can include a polymeric material (e.g., Teflon), a plastic material, and/or a rubber material, among many other material types.

The flow meter, including the electronics, can be located in a cover 220 of the liquid consumption device, located at the bottom of the reservoir 224 and/or located on one or more sides of the reservoir 224. Locating the flow meter in the cover 220 can keep at least a sub-portion of the components of the flow meter isolated from the liquid and/or allow the ability to move the flow meter to multiple reservoir configurations (e.g., move the flow meter from the liquid consumption tracking device illustrated in FIG. 2A to the liquid consumption device illustrated in FIG. 2B). The flow meter can be positioned in the center of the cover 220 aligned with the axis of the tubing 222.

In various embodiments, the cover 220 can include a display. The display can provide information, such as, the date, time, and the amount of liquid that has been consumed in a period of time. A display, as used herein, can include an output device for presentation of information. Example displays can include electronic visual displays, liquid crystal displays (LCD), LEDs, and/or plasma displays, among other displays. In some embodiments, the display can provide a summary message on the display, such as when threshold hydration levels (e.g., hydration goals) have been met.

Alternatively and/or in addition, the cover 220 can include an audio and/or visual indication, such as an LED light located on and/or next to the display. For instance, the cover 220 can be configured to display a green LED light and a summary message on the display when a user is within a threshold hydration level. A red LED light and summary message can be displayed when the user is outside a threshold hydration level. Such a feature can, for instance, facilitate hydration coaching through integration with a hydration plan and the liquid consumption device wireless connectivity.

In various embodiments, the flow meter can include a positive displacement meter. With a positive displacement meter, flow is related to the movement of a member of the flow meter. The member can include turbine, rotary vane, gear, and piston types. In some embodiments, the flow meter can include a velocity meter. With a velocity meter, velocity of liquid is measured through a region of a known cross-section. Example velocity flows can include optical, sonic, and ultrasonic types. Further, the flow meter in various embodiments can include a differential pressure flow meter. A differential pressure flow meter can, for instance, use Bernoulli's equation to measure the flow of liquid in the tubing 222 (e.g., by introducing a constriction in the tubing 222 that creates a pressure decrease across the flow meter, when flow increases more pressure decrease is created).

A flow meter, as used herein, can include an instrument used to measure an amount of liquid. A flow meter can include electronics, mechanical components (e.g., rotor assembly), and/or sensor components (e.g., pressure sensor), for instance. For example, the flow meter can include a turbine flow meter that includes a rotor assembly (e.g., turbine blades) that can rotate on bearings when liquid is consumed by a user from the reservoir 224 through the tubing 222. The turbine flow meter can translate the mechanical rotation of the rotor assembly into a volumetric flow rate. The volumetric flow rate can be totalized (e.g., aggregated) via a microprocessor into an amount of liquid consumed in a particular period of time.

In some embodiments, the flow meter can include an acoustic level sensor located in the bottom of the reservoir 224 and/or the cover 220. With an acoustic level sensor, the level of liquid in the reservoir 224 can be detected based on ultrasonic waves. The acoustic level sensor can be controlled by a timer to take measurements at particular periods of times. Further, in some instances, the liquid consumption device with an acoustic level sensor can include an inclinometer. An inclinometer can include a device for measuring angles of slopes, elevation, and/or depressions. The inclinometer can assure that measurements are taken when the reservoir 224 is near level. That is, the liquid consumption device can measure an amount of liquid in the reservoir 224 using an acoustic level sensor in response to detecting the reservoir 224 is near level using an inclinometer. If the reservoir 224 is not near level, a measurement may not be taken.

In various embodiments, the liquid consumption device can include a sealed reservoir (e.g., reservoir 224 can include a sealed reservoir). A sealed reservoir can include one or more vents to allow air into the reservoir 224 when liquid is consumed out through the tubing 222. The flow meter can be connected to a vent of the reservoir 224 and/or the tubing 222 and can measure the air that enters the vent as liquid is consumed through the tubing 222 (e.g., as discussed further with regards to FIG. 4). The amount of air that enters the vent can be proportional to the amount of liquid that is consumed. In such embodiments, the liquid does not pass through the flow meter.

Although the present embodiment illustrates utilizing a flow meter to track liquid consumed from a liquid consumption device, embodiments in accordance with the present disclosure are not so limited. A variety of methods of tracking and/or measuring liquid consumed can be used. For instance, the fluid in the reservoir 224 can be measured and/or the weight of the reservoir 224 can be measured, among other methods.

In some instances, the flow meter can include a check valve to prevent flow of liquid back into the liquid consumption device and/or to detect flow of liquid back into the liquid consumption device. If used to detect flow of liquid back into the device, the detected flow can be taken into account (e.g., subtracted from the measured liquid consumed in the period of time).

Furthermore, in various embodiments of the present disclosure, portions of the liquid consumption device can be disposable. For instance, the tubing 222 of the liquid consumption device can include two disposable sub-portions. A first disposable sub-portion can be pressed onto the bottom of the flow meter in the cover 220 (e.g., a bottom portion of the tubing 222) and the second disposable sub-portion can be pressed onto the top of the flow meter in the cover 220 (e.g., a top portion of the tubing 222). The bottom portion of the tubing 222 can be rigid and the end of the bottom portion of the tubing 222 can be positioned in the center of the tapered bottom of the reservoir 224. For instance, the reservoir 224 (e.g., the cup and/or container) can have a tapered bottom to accommodate users drinking while lying at an angle (e.g., while lying down). The top portion of the tubing 222 can be flexible to promote a comfortable drinking experience, and can include a variety of lengths to assist users that cannot lift the liquid consumption device.

In various embodiments, the liquid consumption device can include a disposable lining. The disposable lining can be placed inside the reservoir 224 and can assist in ease of cleaning.

FIG. 2A illustrates an example of a liquid consumption device in accordance with one or more embodiments of the present disclosure. The liquid consumption device, as illustrated in FIG. 2A, can include a reservoir 224, a tubing 222, and/or a cover 220. The liquid consumption device illustrated in Figured 2A can be operable to mount to an object associated with the user. For instance, the object can include a bed, a wheel chair and/or other chair, and/or exercise equipment, among other objects. The liquid consumption device can include a component 226 to mount to the object (e.g., a clip and/or other component).

The tubing 222, as illustrated in FIG. 2A, can include a length sufficient for a user to consume liquid without moving the liquid consumption device. For instance, a user may be unable to lift the liquid consumption device due to a health status of the user.

FIG. 2B illustrates an example of a liquid consumption device in accordance with one or more embodiments of the present disclosure. The liquid consumption device, as illustrated in FIG. 2B, can include a reservoir 224, a tubing 222, and/or a cover 220. The liquid consumption device illustrated in FIG. 2B can include a different device than the liquid consumption device illustrated in FIG. 2A.

In various embodiments, the cover 220 of the liquid consumption device illustrated in FIG. 2B can include the same cover 220 of the liquid consumption device illustrated in FIG. 2A. That is, the cover 220 can be interchangeable with a variety of reservoir (e.g., container) sizes and/or a variety of tubing (e.g., straws).

FIG. 2C illustrates an example cover 220 of a liquid consumption device in accordance with one or more embodiments of the present disclosure. The cover 220 illustrated in FIG. 2C can include the cover illustrated in FIG. 2A and FIG. 2B, in various embodiments. The cover 220 can house the electronics, flow meter, user display, and/or batteries of the liquid consumption device to keep at least a sub-portion of the components of the flow meter isolated from the liquid, in various embodiments.

As illustrated in FIG. 2C, the flow meter can be located near the center (e.g., as illustrated by the ring 230 near the center 232 of the cover 220) of the cover 220 and can be aligned with the axis of the tubing. For instance, the tubing can be placed in the center 232 of the cover 220 and the flow meter can be located around the circumference of the tubing (e.g., the center ring 230).

The cover 220 can, for example, include a display 228. The display 228 can provide a variety of information, such as the date, the time, and an amount of liquid consumed in the period of time. In some instances, the cover 220 can include a visual and/or audio indication, such as one or more LED lights. An audio indication can include, for instance, a variety of pulsing beeps.

Figure 3:
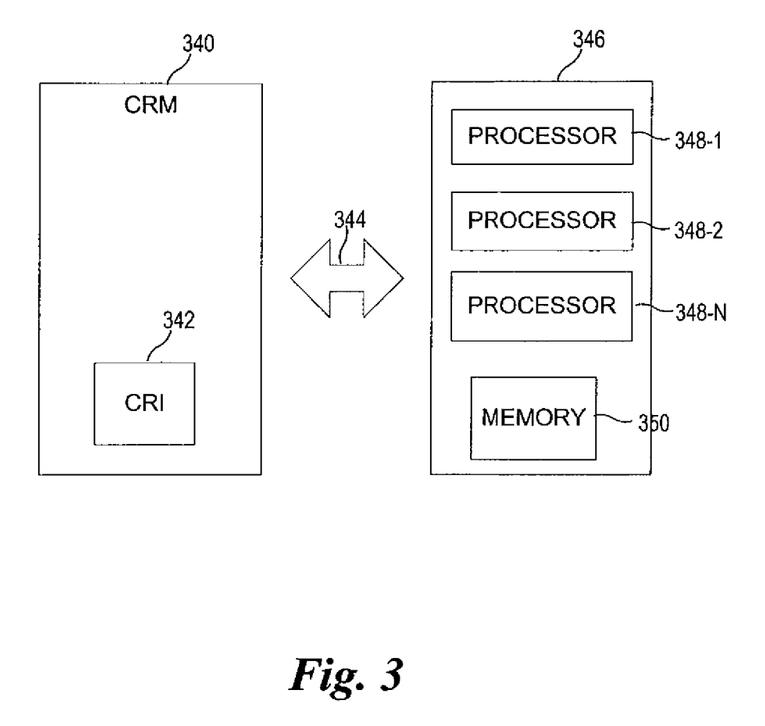
FIG. 3 illustrates an example of a liquid consumption tracking system in accordance with one or more embodiments of the present disclosure.

FIG. 3 illustrates an example of a liquid consumption tracking system in accordance with one or more embodiments of the present disclosure. The liquid consumption tracking system can include a computing device for tracking liquid consumed by one or more users in one or more periods of time, for example.

The computing device, as described herein, can include a computer-readable medium (CRM) 340 in communication with processing resources 348-1, 348-2 . . . 348-N. CRM 340 can be in communication with a device 346 having processing resources 348-1, 348-2 . . . 348-N. The device 346 can be in communication with a tangible non-transitory CRM 340 storing a set of computer-readable instructions (CRI) 342 executable by one or more of the processing resources 348-1, 348-2 . . . 348-N, as described herein. The CRI 342 can also be stored in remote memory managed by a server and represent an installation package that can be downloaded, installed, and executed. The device 346 can include memory resources 350, and the processing resources 348-1, 348-2 . . . 348-N can be coupled to the memory resources 350.

Processing resources 348-1, 348-2 . . . 348-N can execute CRI 342 that can be stored on an internal or external non-transitory CRM 340. The processing resources 348-1, 348-2 . . . 348-N can execute CRI 342 to perform various functions, for example, the processing resources 348-1, 348-2 . . . 348-N can execute CRI 342 to determine a hydration level of one or more users based on aggregated liquid consumption data associated with the one or more users.

A non-transitory CRM (e.g., CRM 340), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory memory can also include distributed storage media. For example, the CRM 340 can be distributed among various locations.

The non-transitory CRM 340 can be integral, or communicatively coupled, to a computing device, in a wired and/or a wireless manner. For example, the non-transitory CRM 340 can be an internal memory, a portable memory, a portable disk, or a memory associated with another computing resource (e.g., enabling CRIs to be transferred and/or executed across a network such as the Internet).

The CRM 340 can be in communication with the processing resources 348-1, 348-2 . . . 348-N via a communication path 344. The communication path 344 can be local or remote to a machine (e.g., a computer) associated with the processing resources 348-1, 348-2 . . . 48-N. Examples of a local communication path 344 can include an electronic bus internal to a machine (e.g., a computer) where the CRM 340 is one of volatile, non-volatile, fixed, and/or removable storage medium in communication with the processing resources 348-1, 348-2 . . . 348-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 344 can be such that the CRM 340 is remote from the processing resources 348-1, 348-2 . . . 348-N, such as in a network relationship between the CRM 340 and the processing resources 348-1, 348-2 . . . 348-N. That is, the communication path 344 can be a network relationship. Examples of such a network relationship can include a local area network (LAN), wide area network (WAN), personal area network (PAN), and the Internet, among others.

In such examples, the CRM 340 can be associated with a first computing device and the processing resources 348-1, 348-2 . . . 348-N can be associated with a second computing device (e.g., a Java® server, etc.). For example, the processing resources 348-1, 348-2 . . . 348-N can be in communication with a CRM 340 wherein the CRM 340 includes a set of instructions and wherein the processing resources 348-1, 348-2 . . . 348-N are designed to carry out the set of instructions to receive data from a health professional including health information associated with the user.

In various embodiments, the liquid consumption tracking system can include one or more liquid consumption devices. A liquid consumption device can track an amount of liquid consumed by a user over a period of time and communicate liquid consumption data including the amount of liquid consumed to the computing device.

The processing resources 348-1, 348-2 . . . 348-N coupled to the memory resource 350 of the computing device can receive health information associated with a user and determine a hydration plan for the user, including at least one threshold hydration level. The processing resources 348-1, 348-2 . . . 348-N coupled to the memory resource 350 of the computing device can determine a hydration level of the user based on received liquid consumption data from the liquid consumption device. Further, the processing resources 348-1, 348-2 . . . 348-N coupled to the memory resource 350 of the computing device can provide a first indication to the user in response to the hydration level of the user being outside the one or more threshold hydration levels and provide a second indication to the user in response to the hydration level of the user being within the one or more threshold hydration levels. The indication can include an audio and/or visual indication, for instance.

In accordance with some embodiments of the present disclosure, the liquid consumption device can include a microprocessor. In such an instance, the liquid consumption device can determine a hydration level of the user based on liquid consumed by the user in a period of time and can provide a first indication and/or a second indication to the user in response to the hydration level of the user being outside and/or within the one or more threshold hydration levels, respectively. The liquid consumption device can communicate the determined hydration level of the user to the computing device.

In various embodiments of the present disclosure, the processing resources 348-1, 348-2 . . . 348-N coupled to the memory resource 350 of the computing device can send an alert to a health professional and/or other user in response to the determined and/or communicated hydration level of the user being outside one or more threshold hydration levels. The alert can be sent to a mobile computing device, for instance.

In accordance with some embodiments, the liquid consumption tracking system can include a plurality of liquid consumption devices. Each of the plurality of liquid consumption devices can be associated with a user among the plurality of user and/or each user can be associated with one or more liquid consumption devices, for instance. That is, the liquid consumption tracking system can track liquid consumed by a plurality of users. One or more liquid consumption devices can be associated with a user among the plurality of users.

The computing device can receive health information associated with the plurality of users and can determine a hydration plan for each user among the plurality based on the health information associated with each user. The computing device can aggregate liquid consumption data received from the plurality of liquid consumption devices over one or more periods of times and can determine a hydration level of each user among the plurality. Further, the computing device can provide indications and/or send alerts based on the determined hydration levels being outside and/or within a threshold hydration level in each user's hydration plan. Alternatively and/or in addition, a liquid consumption device can include a microprocessor, can track liquid consumed by the user, can determine a hydration level of the user, can provide indications, and/or can communicate the hydration level of the user to the computing device.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Figure 4:
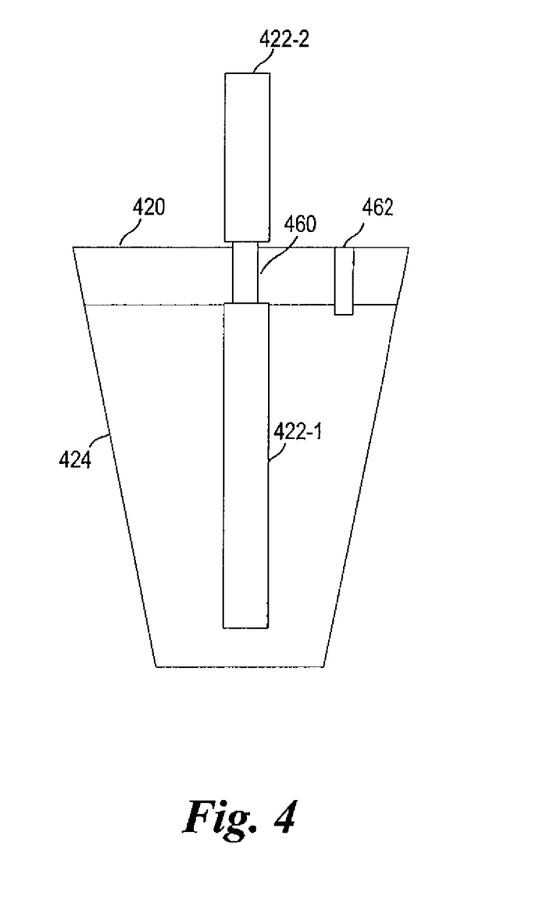
FIG. 4 illustrates an example of a liquid consumption device in accordance with one or more embodiments of the present disclosure.

FIG. 4 illustrates an example of a liquid consumption device in accordance with one or more embodiments of the present disclosure. The liquid consumption device, as illustrated in the embodiment of FIG. 4, can include a reservoir 424, a cover 420, and/or one or more tubing (e.g., a first sub-portion of tubing 422-1 and a second sub-porting of tubing 422-2).

In various embodiments, the tubing can include two sub-portions. The first sub-portion of tubing 422-1 can include a bottom portion of a tube (e.g., an input tube). The first sub-portion of tubing 422-1 can connect to the bottom of the cover 420 (e.g., can connect to a sealed connector 460, as discussed further herein) and the end of the first sub-portion of tubing 422-1 can be positioned in the bottom of the reservoir 424. The second sub-portion of tubing 422-2 can include a top portion of a tube (e.g., an output tube). The second sub-portion of tubing 422-2 can connect to the top of the cover 420 (e.g., can connect to a sealed connector 460, as discussed further herein) to a user. Thereby, a user's mouth can come in contact with the second sub-portion of tubing 422-2 to consume liquid.

The reservoir 424, as illustrated in FIG. 4, can be a sealed reservoir. A sealed reservoir may have no air flowing in the reservoir 424 unless a user is consuming liquid. The reservoir 424 may be sealed using the cover 420 and a sealed connector 460 for the one or more tubing (e.g., 422-1, 422-2). The sealed connector 460 can include a component to seal the first sub-portion of tubing 422-1 to the second sub-portion of tubing 422-2. The cover 420, in various embodiments, can be removed from the reservoir 424 (e.g., such as, for cleaning purposes). The cover 420 and/or reservoir 424 can include one or more vents (e.g., vent 462) to allow air into the reservoir 424 when liquid is consumed out through the tubing 422-1, 422-2.

A flow meter can be connected to a vent 462 and/or the tubing 422-1, 422-2 and can measure the air that enters the vent 462 and/or the reservoir 424 as liquid is consumed through the tubing 422-1, 422-2. The amount of air that enters the vent 462 and/or the reservoir 424 can be proportional to the amount of liquid that is consumed. In such embodiments, the liquid does not pass through the flow meter. Some previous liquid consumption devices are directed to clear liquids due to cleaning issues (e.g., sugary and/or dense liquids may cause issues if they come in contact with the flow meter, such as clogging a turbine flow meter). However, using a flow meter connected to a vent 462 can prevent the flow meter from coming in contact with the liquid and can make cleaning of the liquid consumption device easier than a flow meter that contacts the liquid.

Further, because air flow is being measured, an anemometer flow meter, such as a hot-wire anemometer and/or a micro anemometer, can be used. An anemometer flow meter can include a device for measuring wind speed and/or wind pressure. A hot-wire anemometer can, for instance, use a fine wire to electrically heat up to some temperature above ambient; air flowing past the wire has a cooling effect on the wire and as the electrical resistance of most metals is dependent upon the temperature of the metal, a relationship can be obtained between the resistance of the wire and flow speed.

A micro anemometer, as used herein, can include a device including a thermal flow sensor and a microprocessor (e.g., a microchip). The device can have a pressure-stabilized membrane that is etched into the microprocessor from below and/or the pressure stabilized membrane can have a glass-passivation layer that is closed from the front. The glass-passivation layer can prevent contaminants. A controllable heater element can be mounted to the middle of the pressure-stable membrane and a number of temperature sensors can be mounted symmetrically upstream and downstream from the heater element in the direction of flow. Fluid flow (e.g., liquid flow and/or gas flow, such as air) over the pressure-stable membrane can cause a transfer of heat and generate a precise measurable signal. The microprocessor can amplify and/or evaluate the signal. The measurable signal can be proportional to fluid flow through the tubing 422-1, 422-2 (e.g., fluid flow is proportional to the amount of liquid consumed).

In various instances, multiple vents can be used to assist in ease of drinking for the user. For instance, a first vent can contain the flow meter and a second vent, which is larger than the first vent, can be used to assist in the ease of drinking (e.g., not illustrated by the embodiment of FIG. 4).

Figure 5:
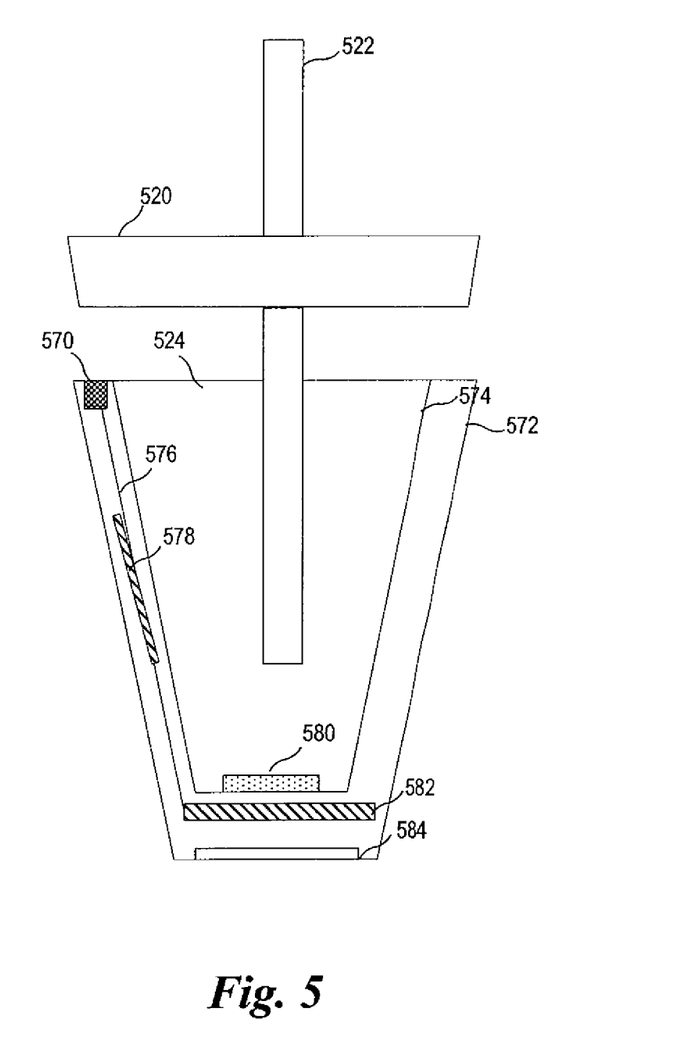
FIG. 5 illustrates an example of a liquid consumption device in accordance with one or more embodiments of the present disclosure.

FIG. 5 illustrates an example of a liquid consumption device in accordance with one or more embodiments of the present disclosure. The liquid consumption device can include a reservoir 524, a tubing 522, a flow meter 580 to track liquid consumed by a user in a period of time, and/or a cover 520. The cover 520 illustrated by FIG. 5 can include a cover that is not attached to the reservoir 524/liquid consumption device.

The flow meter 580 can include a pressure sensor, in various embodiments, as previously discussed. A pressure sensor can, for instance, measure pressure of liquid within the liquid consumption device. As illustrated by FIG. 5, the flow meter 580 can be located at the bottom of the reservoir 524. Example pressure sensors can include an absolute or gauge pressure sensor to measure the liquid level in the reservoir 524.

In some embodiments, as illustrated by FIG. 5, the reservoir 524 of the liquid consumption device can include a double wall reservoir. A double wall reservoir can include an inner wall 574 and an outer wall 572. The inner wall 574 can contact liquid within the reservoir 524 and can prevent the liquid from contacting a space between the inner wall 574 and the outer wall 572. The outer wall 572, by contrast, may not contact liquid within the reservoir 524.

The flow meter 580 can include electronics 582 to track liquid consumption. The electronics can include a computing component (e.g., a processing resource, such as a microprocessor, and a memory resource coupled to the processing resource and storing instructions executable by the processing resource). The electronics 582 of the liquid consumption device can be located in the space between walls 574, 572 of the reservoir 524, for instance. Locating the electronics 582 in the space between the outer wall 574 and the inner wall 572 can keep at least some of the components of the flow meter 580 isolated from the liquid.

In some embodiments, the electronics 582 can include an inclinometer (as previously discussed in connection with FIG. 2) and a battery. An example battery can include a coin cell battery, although embodiments are not so limited.

The inclinometer can assure that measurements are taken when the reservoir 524 is near level. That is, the liquid consumption device can measure a volume of liquid in the reservoir 524 using a pressure sensor in response to detecting the reservoir 524 is near level using an inclinometer. If the reservoir 524 is not near level, a measurement may not be taken.

The electronics 582 and/or space between the walls 574, 572 can be accessed by an access cover 584. The access cover 584 can be located at the bottom of the liquid consumption device, although embodiments in accordance with the present disclosure are not so limited. The access cover can include a removable component of the device allowing access to the space between the walls 574, 572.

In accordance with a number of embodiments, the liquid consumption device can include a switch 570 located in the space between the walls 574, 572 that can be activated when the cover 520 is attached to the reservoir 524/liquid consumption device. A switch, as used herein, can include an electrical component that can activate or deactivate an electrical circuit. Example switches can include a micro-switch and a reed switch.

For example, when a user places liquid in the reservoir 524 and attaches the cover 520 to the reservoir 524/ the liquid consumption device, the switch 570 can activate an electrical circuit associated with the electronics 582 (e.g., activate an electrical circuit associated with the computing component). In some embodiments, the switch 570 can be activated by a magnet located in the cover 520 interacting with a magnet associated with the switch 570. The electrical circuit can include electronic components (e.g., the switch 570, the electronics 582, and/or the display 578) connected by conductive wires or traces 576 through which electric current can flow. The conductive wire or traces 576 can electrically connect the switch 570 to the electronics 582. Thereby, the flow meter 580 may track liquid consumed when the cover 520 is attached to the reservoir 524/ liquid consumption device.

The liquid consumption device can track liquid consumed by measuring a volume of liquid in the liquid consumption device over a period of time using the flow meter 580 and/or the electronics 582. The electronics 582 can include a computing component to determine a hydration level of the user based on liquid consumed by the user in a period of time. As previously discussed, a hydration level can include an amount of liquid consumed by the user in a particular period of time. The hydration level can be associated with a hydration plan of the user.

For example, volume of liquid in the liquid consumption device can be calculated using the example function for a tapered cylindrical reservoir (e.g., reservoir 524):

$$V_{time\ cover\ on} = (\pi h_{time\ cover\ on}/12) \times (d^2 + db = b^2),$$

wherein V is the volume of liquid when the cover 520 is attached and h can include the height of the reservoir 524 of the liquid consumption device. For instance, h can include the output of P/gρ, where P includes pressure, g includes gravity constant, and ρ includes the density of the liquid. Further, d can include the diameter of the bottom of the reservoir 524 and b can include the diameter of the top of the reservoir 524.

The volume consumed (C) for each time interval (e.g., n (Δt)) can be calculated using the example function of:

$$C_{time\ cover\ on+n(\Delta t)} = \Sigma(V_{time\ cover\ on} - V_{time\ cover\ on+n(\Delta t)}),$$

wherein C includes a volume of liquid consumed when the cover 520 is attached, V includes a volume of liquid in the reservoir 524 when the cover 520 is attached, and n(Δt) includes the time interval. The volume consumed in each time interval can be time stamped and stored (e.g., stored as C, t). Each time interval can include a predetermined set of time (e.g., 15 seconds). For instance, a volume of liquid can be measured at each time interval. Further, a total consumption of liquid over time can be calculated using the example function of:

$$T_{interval} = \Sigma C_{time\ from\ time\ 1\ to\ time\ 2\ for\ the\ interval},$$

wherein T includes the total consumption over the interval of time.

In various embodiments, the liquid consumption device can include a display 578 as previously discussed. The display 578 can be located in the space between the walls 574, 572 and can be electrically connected to the electronics 582 when the switch 570 is activated (e.g., when the cover 522 is attached to the reservoir 524), as further discussed herein.

As previously discussed, a visual indication can be provided on the display 578. For example, a visual indication can be provided on the display in response to the hydration level of the user being outside of a threshold hydration level. The visual indication can include an LED light (such as a yellow or red LED light). Further, an indication can be provided in response to the hydration level of the user being within one or more threshold hydration levels (such as a green LED light).

In some embodiments, the display 578 can be associated with the electrical circuit activated by the switch 570. That is, the switch 570 can activate an electrical circuit associated with the display 578 and the electronics 582 (e.g., the computing component) when the cover 520 is attached to the reservoir 524/ liquid consumption device. The activation can connect the switch 570, the display 578, and the electronics 582 and can allow for providing indications on the display 578.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer-implemented method for tracking liquid consumption, comprising:
    determining a hydration plan for a user based on a plurality of parameters of the user using a computing device having processing circuitry and memory circuitry, the plurality of parameters including health information and a health status of the user obtained by the computing device from a database;
    receiving data from a liquid consumption device, including a liquid container and processing circuitry, at the computing device over a period of time;
    aggregating the data received over the period of time to track liquid consumption of the user; and
    identifying the user is outside a threshold hydration level based on the aggregated data and the determined hydration plan.

2. The method of claim 1, wherein the hydration plan includes a modified hydration plan based on data from the liquid consumption device from a prior period of time and the health information related to the user is indicative of the prior period of time, including sending an alert to a mobile computing device in response to the user being outside the threshold hydration level.

3. The method of claim 1, wherein determining the hydration plan includes the computing device accessing a plurality of sources of data to obtain the plurality of parameters, the method further including providing a visual indication on the liquid consumption device based on an amount of liquid consumed by the user and the hydration plan.

4. The method of claim 1, wherein the database includes a healthcare file of the user that contains health measurements of the user, the method further including creating a report of liquid consumption of the user based on the aggregated data over the period of time using the computing device.

5. The method of claim 1, wherein receiving the data from the liquid consumption device includes wirelessly receiving data from a plurality of liquid consumption devices and wherein the health information includes data received from a health professional and obtained from the database.

6. The method of claim 5, wherein each of the plurality of liquid consumption devices is associated with a user among a plurality of users.

7. The method of claim 1, wherein the health information includes lifestyle information indicative of levels of activity of the user.

8. The method of claim 1, further including receiving, at the computing device, at least a portion of the health information from a sensory system, the at least portion including measurements obtained by the sensory system.

9. The method of claim 1, further including receiving at least a portion of the health information, at the computing device, the at least portion including observations input by a person.

10. The method of claim 1, further including receiving at least a portion of the health information, at the computing device, the at least portion including hydration observations input by a person.

11. A system for tracking liquid consumed, comprising:
a liquid consumption device including a liquid container, processing circuitry and memory circuitry to:
track an amount of liquid consumed by a user over a period of time; and
communicate liquid consumption data including the amount of liquid consumed to a computing device;
the computing device to:
receive data including health information associated with the user by accessing a database, wherein the health information includes a plurality of parameters indicative of a health status of the user;
determine a hydration plan for the user including at least one threshold hydration level using the health information and liquid consumption data from the liquid consumption device in a previous period of time; and
determine a hydration level of the user based on the liquid consumption data from the liquid consumption device over the period of time.

12. The system of claim 11, wherein the health information includes at least one data selected from the group consisting of: a medical history of the user, health measurements from a medical device, health measurements from a sensory system, lifestyle information, the health status of the user, and observations by healthcare staff; and
wherein the liquid consumption device further provides a first visual indication to the user to drink liquid in response to the hydration level of the user being outside one or more of the at least one threshold hydration level.

13. The system of claim 12, wherein the liquid consumption device further provides a second visual indication to the user indicating the user is hydrated in response to the hydration level of the user being within the at least one threshold hydration level.

14. The system of claim 11, including:
a plurality of liquid consumptions devices, wherein the liquid consumption device is among the plurality; and
wherein each of the plurality of liquid consumption devices:
tracks an amount of liquid consumed by a particular user over a period of time; and
communicates liquid consumption data including the amount of liquid consumed to the computing device.

15. The system of claim 14, wherein the computing device further:
aggregates the liquid consumption data received from the plurality of liquid consumption devices over the period of time; and
determines a hydration level associated with each of the plurality of liquid consumption devices based on the aggregated liquid consumption data; and
modifies the hydration plan for at least one user associated with at least one of the plurality of liquid consumption devices based on the determined hydration levels.

16. The system of claim 14, wherein each of the plurality of liquid consumption devices is associated with a particular user and wherein the computing device further:
receives health information associated with each of the particular users by accessing at least one database, the database including data from a plurality of sources related to the health status of the user; and
determines a hydration plan for each user among the plurality based on the health information.

17. The system of claim 11, wherein the processing circuitry is configured to identify the user is outside a threshold hydration level based on the liquid consumption data and the determined hydration plan.

* * * * *